Nov. 3, 1942.                M. LIWSCHITZ                2,300,946
                       ELECTRIC SHIP PROPULSION
                        Filed Aug. 22, 1941          2 Sheets-Sheet 1
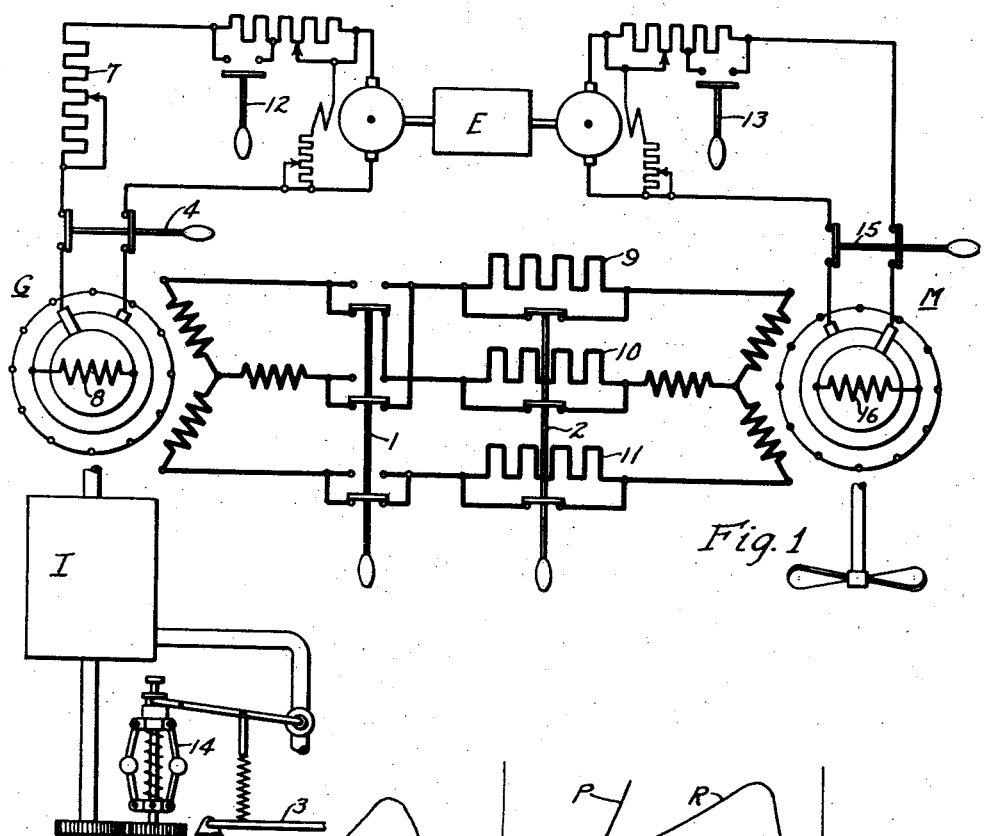
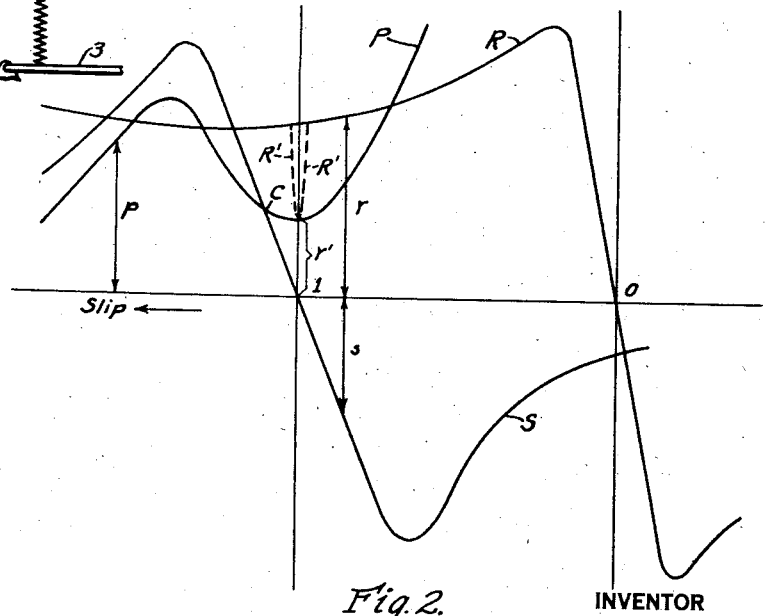
Fig. 2.
WITNESSES:                                    INVENTOR
                                          Michael Liwschitz.
                                              BY
                                          Paul E. Friedemann
                                                ATTORNEY

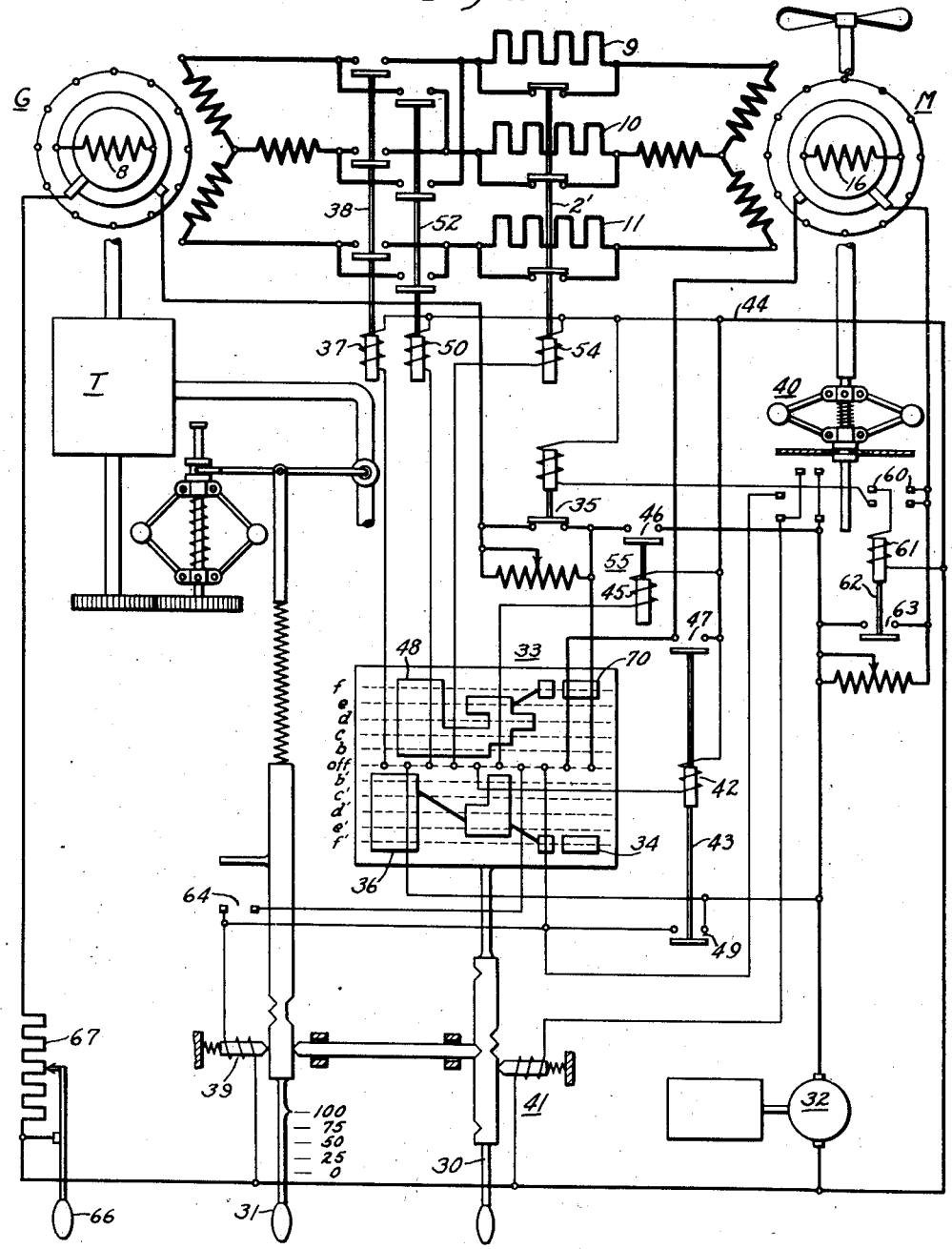

Patented Nov. 3, 1942

2,300,946

UNITED STATES PATENT OFFICE 2,300,946

ELECTRIC SHIP PROPULSION

Michael Liwschitz, Wilkinsburg, Pa., assignor to Westinghouse Electric & Manufacturing Company, East Pittsburgh, Pa., a corporation of Pennsylvania Application August 22, 1941, Serial No. 407,936

11 Claims. (Cl. 172—8)

My invention relates to electric propulsion equipment and, more particularly, to electric ship propulsion equipment utilizing synchronous motors designed to operate also as induction motors for operating the ship propeller.

When a synchronous motor is used to drive a ship propeller, or similar load, there are three possible methods of effecting a reversing operation of the propeller, presumed the motor and the generator are not disconnected from each other during the reversing operation. These methods of reversing are designated generally—first, asynchronous reversing; second, synchronous-asynchronous reversing; and third, synchronous reversing.

Without going into detail as to all steps for each method of reversing, the methods of reversing are essentially as follows:

(a) With the asynchronous method of reversing the propulsion motor is not excited by direct current during the reversing time. With this scheme, the kinetic energy of the system is absorbed by the motor damper windings.

(b) With the synchronous - asynchronous method of reversing, the motor first runs until nearly the standstill point as a synchronous generator, and the generator is not excited, and then second the motor runs as an asynchronous motor with no direct-current excitation while the generator is excited with direct current. During the first period, the kinetic energy is absorbed by the solid parts of the rotor of the generator and also by the damper windings of the generator, if it has any. During the second period, the kinetic energy is absorbed by the damper windings of the motor.

(c) With synchronous reversing, the motor, as well as the generator, is continuously excited, but is not running in synchronism. The energy of the braking thus effected is absorbed partially by the rotor of the generator; that is, the solid parts and damper windings, if the generator has any damper windings, and partially by the damper windings of the motor.

With all three methods of reversing, (a), (b) and (c), a part of the energy required to reverse is absorbed by the stator windings of the motor and the generator. It is generally assumed that these energies are not high. An assumption that these energies are high will necessitate the use of larger machines for a given application.

Every one of the three methods of reversing briefly described above has considerable disadvantages. The method (a) requires a heavy damper winding for the motor. The damper winding is thus a weak point in the system. The method (c) requires that a great part of the kinetic energy has to be absorbed by the rotor of the generator; this is not always admissible. Further, pulsating torques act in the system during the entire reversing process. There is thus a considerable danger of resonance taking place with some mechanical parts. Also, the average torques developed by the motor and generator are low, thus making the reversing time a long one.

The method (b) has, during its first period, the first and third disadvantages of (c), and, during a part of the second period, the second disadvantage of (c).

It is a specific object of my invention to so improve and alter the method (b) that all the advantages of method (a) will be achieved while the disadvantages, namely, the need of a heavy motor damping winding of method (a), and the disadvantages, namely, the loss absorption of the generator rotor, danger of resonance with mechanical parts of the system, and long reversing time of method (b) will be avoided.

A broad object of my invention is the provision of an electric ship propulsion system having greater reliability and efficiency than has heretofore ever been devised.

The foregoing objects are merely illustrative of many other objects that will become apparent from a study of the following specification when done in conjunction with the accompanying drawings, in which:

Figure 1 is a diagrammatic showing of a ship propulsion circuit showing essentials of my invention for effecting the novel reversing method;

Fig. 2 is a showing of some curves of utility in illustrating the merits of my invention; and Fig. 3 is a diagrammatic showing of my invention in its more practical and somewhat automatic and more complete form.

When a synchronous motor is running out of synchronism, it produces two torques, a rotor torque and a stator torque. The rotor torque, designated R in Fig. 2, is a result of the voltage impressed on the motor and disappears when the impressed voltage is zero, as will be the case when the generator is not excited with direct current. The stator torque, designated S in Fig. 2, results from the direct-current excitation of the motor. This stator torque disappears when the motor is not excited with direct current.

In Fig. 2, I show both of these torques, R and S, in relation to slip, $a$. When $a$ equals zero, it means the motor operates at synchronous speed, whereas when $a$ equals 1, it means the motor rotor is at standstill. The reference characters $r$ and $s$ merely indicate the values of torque for some value of slip. The curve P represents the propeller torques that must be overcome by the motor, and $p$ the propeller torque at some clip value.

In order to avoid resonance danger and vibration, the generator, at the beginning of the reversing process, will be either unexcited, preferably by short circuiting the field, or very slightly excited.

In Fig. 1, T represents the turbine, or other prime mover, for operating the generator, or alternator G. The propeller driving motor M is connected to the generator through reversing switch 1 and torque controlling switch 2 as shown.

Let the assumption be that during normal full speed operation in the ahead direction, the circuit connections and the speed lever 3 will be as shown in Fig. 1. If it is desired to reverse the ship, the steps are as follows:

I. The speed lever is moved to the dotted line position or half-speed position or some other speed position.

II. The generator and motor excitation is removed, by opening switches 4 and 15.

III. The reversing switch 1 is operated.

IV. The torque controlling switch 2 is opened to insert the resistor sections 9, 10 and 11 in the connection between generator G and motor M.

V. Excite the motor by closing switch 15.

By this step the generator voltage is zero, or negligible, depending on whether switch 4 is opened or resistor 7 is included in the field circuit of the generator or preferably the generator field is short circuited. The stator torque S only is thus used.

The torque available at this stage can overcome the propeller torque $p$ only when the resistance between the generator and motor is designed so that the maximum values of the torques is larger than the maximum values of the torques $p$ of the propeller and the maximum value of the torques $s$ appears nearly at the same slip $a$ as the maximum values of the torques $p$ of the propeller. Thus, for the designing and selection of this resistance, evidenced by the resistors 9, 10 and 11, the propeller torque curve P, the reactances and resistances of the motor and generator and the excitation of the motor must be taken into account. It is not admissible to take a random value of resistance in order to improve the power factor of the system. The suitable value of the resistance of resistors 9, 10 and 11, is definitely determined by the factors just mentioned.

It is true that a resistance between generator and motor was proposed in order "to improve the power factor." See the United States Letters Patent No. 1,481.882 issued to E. F. W. Alexanderson on January 29, 1924. Such a resistance will, of course, absorb a part of the energy, but a resistance between generator and motor will be effective only when exactly designed by taking into account the reactances, and resistances of the system and the motor excitation. It is not satisfactory merely to improve the power factor of the transmission by a resistance.

If the right value of resistance is taken for resistors 9, 10 and 11, as I do, the stator torques $s$ will bring the motor and thus the propeller to the point C, (see Fig. 2) where the speed torque curves P and S cross each other, that is, where the stator torque of the motor is equal to the torque of the propeller. As can be seen from Fig. 2 the continuation of the reversing process can now be accomplished only when supported by the rotor torques $r$, because with decreasing slip the stator torques $s$ become smaller than the propeller torques $p$.

In order to produce the rotor torques $r$ the generator must be excited, thus at point C the generator excitation has to be set up. Since the stator torques of the motor become negative for slip values smaller than one, the field current of the motor has to be zero at a slip of $a$ equal to one, that is, at motor standstill, otherwise the resulting motor torques, $(r+s)$, will be decreased by the motor excitation at slips smaller than unity. However, immediately at point C after the generator excitation has been fully built up, the motor excitation is removed, in order to shorten the period when both machines are excited, namely, the period when pulsating torques are produced. At the same time, the resistors 9, 10 and 11 should be shunted. This is done by switch 2 in Fig. 1 or by switch 2' in Fig. 3. From the foregoing step VI will be apparent.

VI. When the motor has been brought to point C by the stator torque, excite the generator with direct current by closing the switch to get the aid of the rotor torque. This will be at a low propeller speed but the slip will still be greater than unit. During this stage over-excitation may be used by closing switch 12.

As part of step VI, as explained above, the motor excitation is removed as soon as the generator excitation is built up and also the torque control resistors 9, 10 and 11 are short circuited. This is done by opening switch 15 and closing switch 2'.

Pulsating torques and danger of resonance exist during the time period when the motor as well as the generator are excited, since the motor is out of synchronism. To avoid this the governor of the prime mover, as explained under step I, was used. It can be shown that the pulsating torques have the frequency $2af_1$, where $f_1$ is the frequency of the generator at the time the generator excitation is applied. The dangerous conditions of resonance occur when the frequencies $2af_1$ coincide with the natural frequency of some mechanical part of the system.

With my arrangement and method of reversal it is possible during the step I to change the frequency $f_1$ over a wide range by the speed lever 3, which adjusts the governor 14 of the prime mover T. This makes it possible to adjust the frequency $f_1$ and consequently the pulsating frequency $2af_1$ in such a manner that the value of $2af_1$ will be far removed from any natural frequency of the system.

For example, when the command "full speed astern" is given, usually according to prior art, the governor of the prime mover is set up for the speed at which the motor and generator have to be synchronized (20% to 25% of the propeller speed when turbine driven, and about 30% when Diesel driven).

It is thus very valuable to avoid resonance to first put the governor at an intermediate speed point, as step I, and to bring the governor to the final or lowest speed position only when the motor operates near point C or slightly beyond point C. At this point the generator excitation is fully built up while the motor excitation is zero, that is, at this point the torques of the propeller are overcome by the rotor torques $r$ only. The next step is thus clear.

VII. Change governor setting, that is, the speed lever 3, to 25% to 30% of full speed.

VIII. After the motor has speeded up to full balancing induction-motor speed re-excite motor field 16 by closing switch 15.

IX. At this point over-excitation may be temporarily used by closing switch 13 to thus effect rapid synchronization.

X. Move speed lever to the desired speed, as full speed. The reversing operation is thus completed.

In Fig. 3, my invention is illustrated in its more complete form with the control equipment so correlated as to relieve the attendant of the burden of correctly reversing the propeller. The equipment, except for speed responsive device 40, is shown in the position it holds while the turbine is operating idly at full speed, say, for heating purposes, but driving the generator at no-load and unexcited. Speed responsive device 40 is shown at its full speed position.

During normal ahead operation the reversing control lever 30 will be in position $f^1$. In this position the speed lever 31 will be in the position shown, the turbine T and generator G operating at full speed. In the $f^1$ position the following circuits will be established. One circuit is established from the exciter 32 through rheostat 33, field 16 of motor M, controller segment 34, electromagnetic switch 35, field 8 of generator G and then back to exciter 32. Another circuit is established from exciter 32, controller segment 36, coil 37 of reversing switch 38 back to exciter 32. The reversing switch 38 is thus closed and the motor M is directly connected to the generator. Latch 39 is also energized to permit free movement of speed lever 31. If now the command "full speed astern" is given the following procedure is carried out.

I. Speed lever 31 is first moved, for example, to the 50% speed position. This removes the full speed torque from the motor and the propeller speed will drop rapidly to substantially 75% of its original speed, because the speed of the propeller acting as a turbine, with the ship still running at full speed, is, with ship hull designs now in general use, always about 75% speed.

Lever 30, being released by the movement of the speed lever 31, is now, not too rapidly but immediately, moved to the b position. During this movement the field circuit for fields 8 and 16 is immediately opened when lever is moved off the $f'$ position. As the lever 30 enters the position shown coil 37 is deenergized, thus, for the moment operating switch 38 to the open position to thus disconnect the motor M from the generator G. In the b position for lever 30 the following circuits are established.

A circuit is established from exciter 32 through controller segment 48, coil 50 of reversing switch 52 to the energized conductor 44. Another circuit is established from energized controller segment 48 through coil 54 of torque controlling contactor 2' to energized conductor 44. A still further circuit is established from energized segment 48 through coil 42 to energized conductor 44. In the b position, since the propeller speed if just beginning to be reduced, latch 40 holds the lever 30 in the b position. This movement of lever 30 thus provides for steps II, III, IV and V by removing the excitation from the generator, opening the reversing switch 38 and closing the reversing switch 52, of inserting the resistors 9, 10 and 11 in the motor generator circuit, and re-exciting the motor.

When the motor by reason of the stator torque, has decreased the propeller speed to point C, see Fig. 2, speed responsive device 40 energizes latch 41 thus permitting the movement of lever 30 to the c position. In the c position coil 45 of contactor 55 is energized causing the closing of contacts 46. This means that step VI is practiced because the generator field 8 is again excited. The rotor torque thus aids in further decreasing the speed of the propeller. Since overexcitation of both the generator and motor may be desirable at this point, I have made provision therefor. The generator is overexcited because switch 35 is closed and the motor is overexcited because the speed responsive device 40 closes contacts 60, thus energizing coil 61 of relay 62. Operation of relay 62 closes contact members 63 which shunt the rheostat 33.

At this stage of asynchronous operation, when both the motor and generator are excited, the danger of resonance exists. This resonance is avoided by proper speed selection of step I. However, it is nevertheless desirable to make this time of asynchronous operation short. This is helped by the overexcitation.

As the propeller speed decreases still more contacts 60 open and 64 are closed to remove the overexcitation (by operation of the speed lever to the synchronizing speed, which may be at 25% or 30% of full speed) from both the generator and the motor by causing the opening of both switches 35 and 63.

Lever 31, will, of course, be free to move because latch 39 is energized from the exciter through switch 49 which is closed at this stage.

Lever 30 is now moved to the d position. In this position the generator is excited and the motor is not excited and the motor accelerates as an induction motor. At the same time coil 54 is deenergized thus removing the resistors 9, 10 and 11 from the circuit interconnecting the motor and generator. By this change in speed setting of lever 31 and the operation of lever 30 the latter part of step VI and step VII are practiced and part of step VIII is practiced.

When the motor is up to balancing speed, lever 30 is moved to the c position. The motor thus synchronizes. The speed responsive device is usually so adjusted that switches 35 and 63 are closed, thus providing for overexcitation at the time of synchronization.

In the f position the fields 8 and 16 are connected in series through contact segment 70 for normal operation. The speed lever may now be moved to the reverse speed desired. This completes steps VIII, IX and X.

Sometimes, while reversing or driving at low speed in the harbor, it is desirable to hold the propeller at standstill. This is very easy to accomplish in a geared type steam turbine driven ship. Diesel driven ships are often provided for this purpose with a mechanical brake.

For electric ship propulsion with synchronous motors according to prior practice, the motor armature is short circuited to keep it at standstill. This means that the stator winding has to be able to absorb a great amount of heat; an increase in the size of the machine is the result.

I propose to stop the propeller in the following simple way without the danger of overheating the stator windings of the motor.

Near the standstill point I drive the motor as an induction motor. This is accomplished by moving lever 30 to the position thus deenergizing coil 42 of contactor 43, and thus opening the motor field circuit at contacts 47. Its torque is thus produced by the damper winding only, that is, the rotor torque only is used. The excitation of the generator field 8, now made through contacts 46, is now regulated by shifting lever 66 to the desired position to vary the resistance value of resistor 67 in the field circuit. The excitation is so regulated that the motor torque at standstill will be nearly equal to the propeller torque at standstill. This is illustrated in Fig. 2 by the R' portion of the rotor torque curve R. Note that at unity slip $p$ and $r'$ are nearly equal. The speed regulation is much the same as for a steam turbine driven ship. The speed of the propeller is not absolutely zero, but somewhat different from zero either in one direction or the other direction.

The specific circuits shown and described and the specific speeds selected, as 25% and 50%, are merely illustrative and are not to be taken in a limiting sense. The scope of my invention is more definitely expressed in the appended claims.

I claim as my invention:

1. In an electric ship propulsion system including a synchronous propeller driving motor adapted to operate with induction motor characteristics and an alternator, coupled to a variable speed prime mover, adapted to be connected to supply alternating current energy to the motor, in combination, means for interconnecting the alternator and motor for full speed ahead operation, means for decreasing the alternator speed a selected amount, control means reversing the connection of the motor to the alternator, said control means including means for effecting the removal of excitation from the alternator only and of effecting a selected change in the impedance in the circuit interconnecting the alternator and motor, means responsive to a predermined change in motor speed for exciting the motor to bring it to standstill, and further control means for normally accelerating the motor in the reverse direction to full synchronous speed.

2. In an electric ship propulsion system, in combination, a variable speed prime mover, an alternator coupled to the prime mover, a motor of the synchronous type, but designed to also be operable as an induction motor coupled to the ship propeller to drive the same, connected to the alternator, an impedance having characteristics so selected as to match the alternator and motor characteristics that the maximum value of the motor stator torque is larger than the maximum value of the propeller torque during reversing and that the maximum value of the motor stator torque appears nearly at the same slip as the maximum value of the propeller torque, and reversing control means for substantially simultaneously reversing the connection of the motor to the alternator, connecting the impedance in the reversed connection between motor and alternator, and of removing the excitation from the alternator while maintaining the motor excited.

3. In a system of electric ship propulsion including a propeller driving synchronous electric motor designed to also operate as an induction motor, an alternator connected to operate the motor, and a variable speed prime mover for driving the alternator, of reversing control means for reversing the propeller, said reversing control means including speed control means for decreasing the speed of the prime mover, means for deenergizing the field of the motor, means for reversing the connection of the motor to the alternator, means for inserting an impedance in the reversed connection of the motor and alternator, said impedance having characteristics such that the stator torque of the motor is greater than, but varies with, the variations in propeller torque with changes in slip of the motor from two hundred per cent slip down to a relatively small value of slip greater than one hundred per cent slip, means for also exciting the alternator to further decrease the slip of the motor from the relatively small value of slip greater than one hundred per cent slip to substantially one hundred per cent slip, means for overexciting both the alternator and motor during changes in slip from said relatively small value of slip greater than one hundred per cent slip to substantially one hundred per cent slip, means for removing the excitation from the motor at one hundred per cent slip to thus accelerate the motor in the reverse direction as an induction motor, means for synchronizing the motor after it has attained balancing induction motor speed, means for overexciting both the alternator and motor during synchronization to provide a heavy pull-in torque, and means for removing the over-excitation after the motor has been synchronized, said speed control means being now operable to select any normal reverse operation of the propeller motor.

4. In a system of electric ship propulsion including a propeller driving synchronous electric motor designed to also operate as an induction motor, an alternator connected to operate the motor, and a variable speed prime mover for driving the alternator, of reversing control means for reversing the propeller, said reversing control means including speed control means for decreasing the speed of the prime mover, switching means for deenergizing the field of the motor, means for reversing the connection of the motor to the alternator, said switching means being operable after the operation of the last named means to again excite the motor, means for inserting an impedance in the reversed connection of the motor and alternator, said impedance having characteristics such that the stator torque of the motor is greater than, but varies with, the variations in propeller torque with changes in slip of the motor from two hundred per cent slip down to a relatively small value of slip greater than one hundred per cent slip, means for also exciting the alternator to further decrease the slip of the motor from the relatively small value of slip greater than one hundred per cent slip to substantially one hundred per cent slip, means for removing the excitation from the motor at one hundred per cent slip to thus normally accelerate the propeller driving motor to normal full speed reverse operation.

5. In a system of electric ship propulsion including a propeller driving synchronous electric motor designed to also operate as an induction motor, an alternator connected to operate the motor, and a variable speed prime mover for driving the alternator, of reversing control means for reversing the propeller, said reversing control means including speed control means for decreasing the speed of the prime mover, switching means for deenergizing the field of the motor, means for reversing the connection of the motor to the alternator, said switching means being operable after the operation of the last named means to again excite the motor, means for inserting an impedance in the reversed connection of the motor and alternator, said impedance having characteristics such that the stator torque of the motor is greater than, but varies with, the variations in propeller torque with changes in slip of the motor from two hundred per cent slip down to a relatively small value of slip greater than one hundred per cent slip, means for also exciting the alternator to further decrease the slip of the motor from the relatively small value of slip greater than one hundred per cent slip to substantially one hundred per cent slip, means for removing the excitation of the motor at the one hundred per cent slip, means for so varying the alternator excitation at the one hundred per cent slip so as to make the stator torque substantially equal to the propeller torque to thus be able to hold the propeller at standstill, namely, at one hundred per cent slip.

6. In a system of electric ship propulsion including a propeller driving synchronous electric motor designed to also operate as an induction motor, an alternator connected to operate the motor, and a variable speed prime mover for driving the alternator, of reversing control means for reversing the propeller, said reversing control means including speed control means for decreasing the speed of the prime mover, switching means for deenergizing the field of the motor, means for reversing the connection of the motor to the alternator, said switching means being operable after the operation of the last named means to again excite the motor, means for inserting the impedance in the reversed connection of the motor and alternator, said impedance having characteristics such that the stator torque of the motor is greater than, but varies with, the variations in propeller torque with changes in slip of the motor from two hundred per cent slip down to a relatively small value of slip greater than one hundred per cent slip, means for also exciting the alternator to further decrease the slip of the motor from the relatively small value of slip greater than one hundred per cent slip to substantially one hundred per cent slip, means for overexciting both the alternator and the motor during changes in slip from said relatively small value of slip greater than one hundred per cent slip to substantially one hundred per cent slip, means for removing the excitation of the motor at the one hundred per cent slip, means for so varying the excitation of the alternator at the one-hundred per cent slip so as to make that stator torque substantially equal to the propeller torque to thus hold the propeller at standstill.

7. In a system of electric ship propulsion including a propeller driving synchronous electric motor designed to also operate as an induction motor, an alternator connected to operate the motor, and a variable speed prime mover for driving the alternator, of reversing control means for reversing the propeller, said reversing control means including speed control means for decreasing the speed of the prime mover, switching means for deenergizing the field of the motor, means for reversing the connection of the motor to the alternator, said switching means being operable after the operation of the last named means to again excite the motor, means for inserting an impedance in the reversed connection of the motor and alternator, said impedance having characteristics such that the stator torque of the motor is greater than, but varies with, the variations in propeller torque with changes in slip of the motor from two hundred per cent slip down to a relatively small value of slip greater than one hundred per cent slip, means for also exciting the alternator to further decrease the slip of the motor from the relatively small value of slip greater than one hundred per cent slip to substantially one hundred per cent slip.

8. In a system of electric ship propulsion including a propeller driving synchronous electric motor designed to also operate as an induction motor, an alternator connected to operate the motor, and a variable speed prime mover for driving the alternator, of reversing control means for reversing the propeller, said reversing control means including speed control means for decreasing the speed of the prime mover, switching means for deenergizing the field of the motor, means for reversing the connection of the motor to the alternator, said switching means being operable after the operation of the last named means to again excite the motor, means for inserting an impedance in the reversed connection of the motor and alternator, said impedance having characteristics such that the stator torque of the motor is greater than, but varies with, the variations in propeller torque with changes in slip of the motor from two hundred per cent slip down to a relatively small value of slip greater than one hundred per cent slip.

9. In a system of electric ship propulsion including a propeller driving synchronous electric motor designed to also operate as an induction motor, an alternator connected to operate the motor, and a variable speed prime mover for driving the alternator, of reversing control means for reversing the propeller, said reversing control means including speed control means for decreasing the speed of the prime mover, switching means for deenergizing the field of the motor, means for reversing the connection of the motor to the alternator, said switching means being operable after the operation of said last named means to again excite the motor, means for inserting an impedance in the reversed connection of the motor and alternator, said impedance having characteristics such that the stator torque of the motor is greater than, but varies with, the variations in propeller torque with changes in slip of the motor from two hundred per cent slip down to a relatively small value of slip greater than one hundred per cent slip, means for also exciting the alternator to further decrease the slip of the motor from the relatively small value of slip greater than one hundred per cent slip to substantially one hundred per cent slip, means for overexciting both the alternator and motor during changes in slip from said relatively small value of slip greater than one hundred per cent slip to substantially one hundred per cent slip, means for removing the excitation from the motor at one hundred per cent slip to thus accelerate the motor in the reverse direction as an induction motor, means for synchronizing the motor after it has attained balancing induction motor speed, said speed control means being now operable to select any normal reverse operation of the propeller motor.

10. In a system of electric ship propulsion including a propeller driving synchronous electric motor designed to also operate as an induction motor, an alternator connected to operate the motor, and a variable speed prime mover for driving the alternator, of reversing control means for reversing the propeller, said reversing control means including speed control means for decreasing the speed of the prime mover, switching means for deenergizing the field of the motor, means for reversing the connection of the motor to the alternator, said switching means being operable after the operation of said last named means to again excite the motor, means for inserting an impedance in the reversed connection of the motor and alternator, said impedance having characteristics such that the stator torque of the motor is greater than, but varies with, the variations in propeller torque with changes in slip of the motor from two hundred per cent slip down to a relatively small value of slip greater than one hundred per cent slip, means for also exciting the alternator to further decrease the slip of the motor from the relatively small value of slip greater than one hundred per cent slip to substantially one hundred per cent slip, means for removing the excitation from the motor at one hundred per cent slip to thus accelerate the motor in the reverse direction as an induction motor, means for synchronizing the motor after it has attained balancing induction motor speed, means for overexciting both the alternator and motor during synchronization to provide a heavy pull-in torque, and means for removing the overexcitation after the motor has been synchronized, said speed control means being now operable to select any normal reverse operation of the propeller motor.

11. In a system of electric ship propulsion including a propeller driving synchronous electric motor designed to also operate as an induction motor, an alternator connected to operate the motor, and a variable speed prime mover for driving the alternator, of reversing control means for reversing the propeller, said reversing control means including speed control means for decreasing the speed of the prime mover, switching means for deenergizing the field of the motor, means for reversing the connection of the motor to the alternator, said switching means being operable after the operation of the last named means to again excite the motor, means for inserting an impedance in the reversed connection of the motor and alternator, said impedance having characteristics such that the stator torque of the motor is greater than, but varies with, the variation in propeller torque with changes in slip of the motor from two hundred per cent slip down to a relatively small value of slip greater than one hundred per cent slip, means for also exciting the alternator to further decrease the slip of the motor from the relatively small value of slip greater than one hundred per cent slip to substantially one hundred per cent slip, means for removing the excitation from the motor at one hundred per cent slip to thus accelerate the motor in the reverse direction as an induction motor, means for synchronizing the motor after it has attained balancing induction motor speed, said speed control means being now operable to select any normal reverse operation of the propeller motor.

MICHAEL LIWSCHITZ.